US 8,521,091 B2

(12) United States Patent
Miscopein et al.

(10) Patent No.: US 8,521,091 B2
(45) Date of Patent: Aug. 27, 2013

(54) METHOD OF MEASURING A DISTANCE BETWEEN TWO RADIO-COMMUNICATION DEVICES AND DEVICE ADAPTED TO IMPLEMENT ONE SUCH METHOD

(75) Inventors: Benoit Miscopein, Grenoble (FR); Jean Schwoerer, Grenoble (FR); Frederic Evennou, Grenoble (FR)

(73) Assignee: France Telecom, Paris (FR)

( * ) Notice: Subject to any disclaimer, the term of this patent is extended or adjusted under 35 U.S.C. 154(b) by 1645 days.

(21) Appl. No.: 11/794,677

(22) PCT Filed: Dec. 23, 2005

(86) PCT No.: PCT/FR2005/003275
§ 371 (c)(1),
(2), (4) Date: Jul. 3, 2007

(87) PCT Pub. No.: WO2006/072697
PCT Pub. Date: Jul. 13, 2006

(65) Prior Publication Data
US 2009/0270042 A1    Oct. 29, 2009

(51) Int. Cl.
*H04B 17/00* (2006.01)
(52) U.S. Cl.
USPC .......................................... 455/67.11; 342/118
(58) Field of Classification Search
None
See application file for complete search history.

(56) References Cited

U.S. PATENT DOCUMENTS

| | | | | |
|---|---|---|---|---|
| 4,677,612 A | * | 6/1987 | Olson et al. | 370/445 |
| 5,706,428 A | * | 1/1998 | Boer et al. | 370/342 |
| 5,974,057 A | * | 10/1999 | Rozanski et al. | 370/519 |
| 6,054,950 A | * | 4/2000 | Fontana | 342/463 |
| 6,133,876 A | * | 10/2000 | Fullerton et al. | 342/375 |
| 6,876,326 B2 | * | 4/2005 | Martorana | 342/463 |
| 6,892,055 B2 | * | 5/2005 | Rosenfeld | 455/65 |
| 7,411,551 B2 | * | 8/2008 | Choi et al. | 342/465 |
| 7,489,904 B2 | * | 2/2009 | Belcea | 455/67.11 |
| 7,512,113 B2 | * | 3/2009 | Luaces | 370/350 |
| 7,962,150 B2 | * | 6/2011 | Hertzog et al. | 455/456.1 |
| 7,995,644 B2 | * | 8/2011 | Sahinoglu et al. | 375/221 |
| 2002/0118723 A1 | | 8/2002 | McCrady et al. | |

FOREIGN PATENT DOCUMENTS

| | | |
|---|---|---|
| WO | WO 02/063327 | 8/2002 |
| WO | WO 03/019826 | 3/2003 |
| WO | WO 2005020600 A2 * | 3/2005 |

OTHER PUBLICATIONS

McCrady et al., Mobile Ranging Using Low-Accuracy Clocks, Jun. 2000, IEEE Transactions on Microwave Theory and Techniques, vol. 48 No. 6, pp. 951-957.*
Benoit, Denis; "Ranging Protocols and Network Organization", Aug. 10, 2004.

(Continued)

*Primary Examiner* — Nay A Maung
*Assistant Examiner* — Alejandro Rivero
(74) *Attorney, Agent, or Firm* — Knobbe Martens Olson & Bear LLP

(57) ABSTRACT

The invention relates to a method of measuring a distance between two radio-communication devices (1, 2), consisting in measuring a radio signal exchange delay. According to the invention, the time-of-flight of the signals is calculated from the exchange delay and subsequently corrected using an analysis of a single channel measuring frame that is transmitted between the two devices. The corrected time-of-flight corresponds to the shortest propagation path followed by the radio signals. In the majority of radio transmission medium configurations, the corrected time-of-flight is a straight line measurement of the distance separating the two devices (1, 2).

13 Claims, 2 Drawing Sheets

(56) References Cited

OTHER PUBLICATIONS

Fleming, Robert et al.; "Low-Power, Miniature, Distributed Position Location and Communication Devices Using Ultra-Wideband, Nonsinusoidal Communication Technology", Semi-Annual Technical Report, Contract J-FBI-94-058, Prepared for Advanced Research Projects Agency; Federal Bureau of Investigation, *Wireless, Adaptive, Mobile Information Systems Principal Investigators Meeting*, Jul. 1995.

Lee, Joon-Yong; "Ulta-Wideband Ranging in Dense Multipath Environments"; A Dissertation Presented to the Faculty of the Graduate School University of Southern California, in Partial Fulfillment of the Requirements for the Degree Doctor of Philosophy (Electrical Engineering); May 2002.

J. Caffery, Jr., et al., Overview of Radiolocation in CDMA Cellular Systems, XP-000752569, Georgia Institute of Technology, IEEE Communications Magazine, 1998, pp. 38-45.

\* cited by examiner

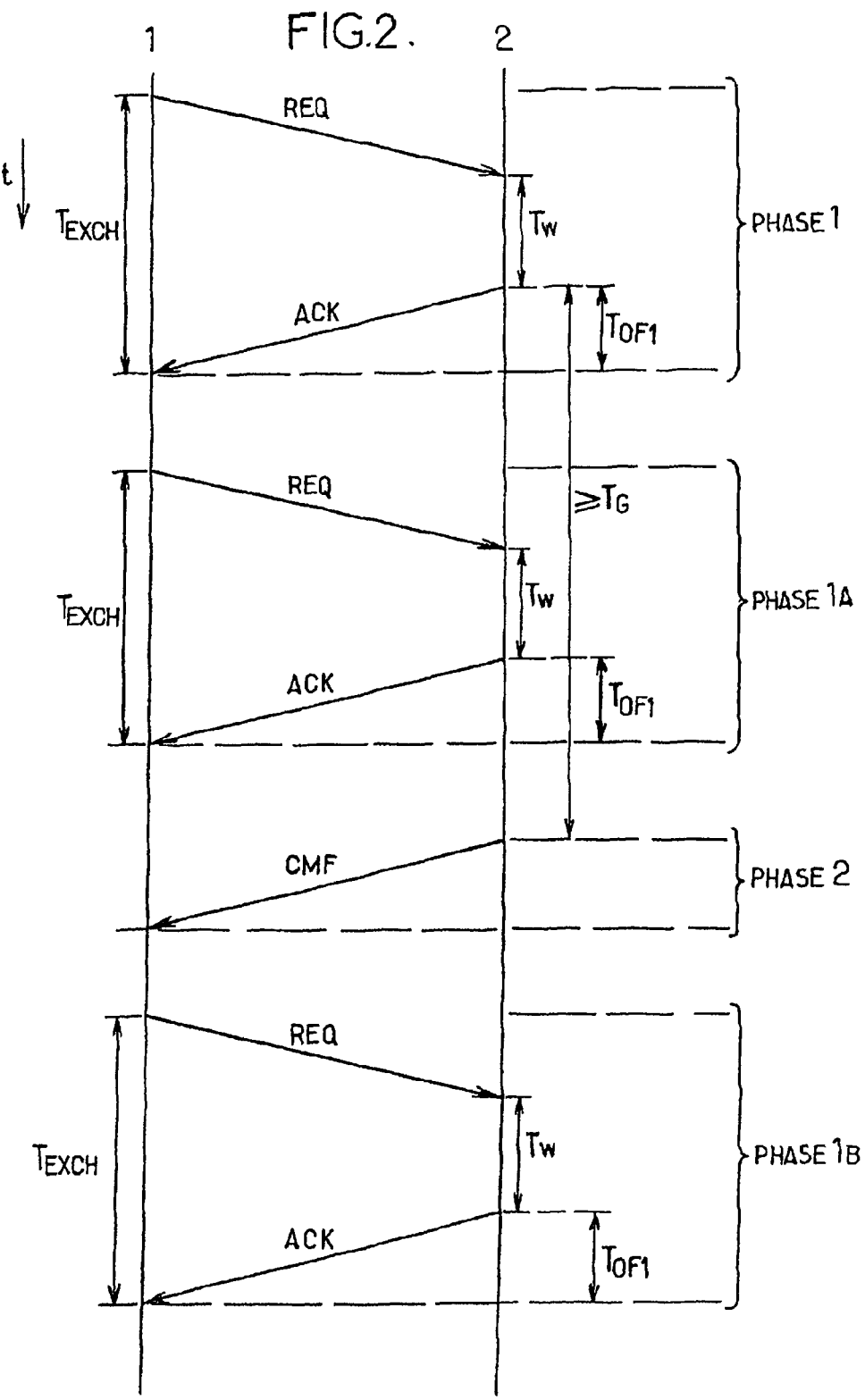

METHOD OF MEASURING A DISTANCE
BETWEEN TWO RADIO-COMMUNICATION
DEVICES AND DEVICE ADAPTED TO
IMPLEMENT ONE SUCH METHOD

This application claims priority from PCT/FR2005/003275 filed Dec. 23, 2005, which claims the priority from French Application FR 05 00015, filed Jan. 03, 2005, both of which are hereby incorporated by reference in their entirety.

BACKGROUND OF THE INVENTION

The present invention relates to a method of measuring a distance between radiocommunication devices, and a device suitable for implementing such a method.

It is often useful to know the position of a radiocommunication device. Such is the case, in particular, when contextual information, that is, the relevance of which depends on the position of the user of the equipment, needs to be transmitted. Such is also the case when a mobile radiocommunication device is linked to a meshed network or to an "ad hoc" network which uses a routing algorithm based on the position of the mobile device. The term "ad hoc" network is used to mean a transmission network capable of recognizing changes to the latter autonomously, that is, with no outside intervention. Radio networks deployed to determine the position of mobile devices having individual electronic labels, or for guiding a holder of a mobile device in a determined site are other examples of applications to which the invention can be applied.

Several methods already exist which make it possible to determine the position of a radiocommunication device. Among these, the triangulation-based methods require a map of reference radio stations whose positions are listed to be stored. Other methods are based on measuring the receive strength of a radio signal, but they require a calibrated radio transmission strength scale to be implemented. Such methods consequently require storage, measurement and/or control means that are complex.

Also known is a method of estimating a distance between two radiocommunication devices by determining a propagation time for radio signals transmitted between said devices. Such a time is called time of flight, and is determined as follows:
  a first device transmits a radio signal requesting a distance measurement and simultaneously triggers a chronometer internal to that device;
  a second device receives the request signal and, after an intermediate time known to both devices, sends an acknowledgement radio signal to the first device; and
  the first device stops the chronometer when it receives the acknowledgement signal.

The distance between the two devices is then estimated by subtracting the intermediate delay from the clocked time, and by dividing the remaining time obtained by two times the propagation speed of the radio signals. Such a method of estimating distance is relatively exact when the two devices are far apart from each other, and when the radio signals are propagated in a straight line between them. However, when the two devices are fairly close together, the accuracy of a duly obtained distance estimation is strongly affected by an uncertainty relating to the intermediate delay between the reception of the request by the second device and the transmission of the acknowledgement signal by said device.

Furthermore, when there are several propagation paths between the two devices, that is, in space diversity cases, the estimated distance does not necessarily correspond to the distance between the two devices which is measured in a straight line. It most often corresponds to the propagation path followed by a main part of the energy of the transmitted radio signals. When a large part of the energy of the radio signals is subject to at least one reflection between the two devices, the result of the distance estimation that is obtained can be very much greater than the real value of the distance between the two devices, which is measured in a straight line.

To obtain an estimation of the straight-line distance that separates two devices, channel measurement frames are used for each of the request and acknowledgement signals that are transmitted to determine the time of flight of the radio signals. Such channel measurement frames are well known. Their structure makes it possible to determine differences between the times of flight of radio signals that follow separate propagation paths. They also make it possible to detect the shortest of the propagation paths followed from the transmitting device by a part of the energy of the radio signal. The distance is then estimated according to the time of flight of the request and acknowledgement signals which corresponds to the shortest propagation path between the two devices. For most propagation medium configurations, the result obtained corresponds to the measurement of the distance in a straight line. All the subsequent events that occur within each device for the relevant communication are then identified relative to the shortest propagation time between the two radio devices.

Now, a channel measurement frame is particularly long, compared to a communication frame. Consequently, the distance measuring method based on an exchange of channel measurement frames as described above presents the following drawbacks:
  two channel measurement frames are transmitted in total, which corresponds to a large quantity of energy consumed in the radiocommunication devices. Such energy consumption is disadvantageous in the case of mobile devices with autonomous energy supply;
  each channel measurement frame requires a significant time to construct and transmit said frame. If the device for which such a frame is intended is not available, the energy consumed in the transmitting device and the radio resource used to transmit the frame are lost;
  the intermediate delay between the reception of the request frame and the transmission of the acknowledgement frame must be greater than the time to construct the channel measurement frame which is used for the acknowledgement signal. It is therefore long, which generates an imprecision in the estimation of the distance between the two devices when the internal clock of at least one of the two devices is liable to drift. Such an imprecision can generate a major error in the estimation of the time of flight for two radio devices close to each other;
  to enable the time of flight of the frames to be measured, the terminal receiving the request frame unilaterally mobilizes the radio resource on expiry of the intermediate delay to transmit the acknowledgement frame. Such pre-emption of the radio resource needs to occur after said intermediate delay, with a maximum delay of the order of a nanosecond, only. For this, other communications involving the device transmitting the acknowledgement frame must be interrupted if necessary. The result is a disruption that is all the greater when the acknowledgement frame is long;
  finally, the communication is continued according to the radio signals received by each device that follow the shortest propagation path. These signals can correspond to a far weaker reception energy than that of the signals transmitted via another propagation path. The communication then has a dependability level lower than that which would result from the use of radio signals received with a greater energy.

It would be possible to overcome this last drawback by having two receivers within each radio device. The first receiver could be synchronized on the received radio signals that correspond to the shortest propagation path, and the second receiver could be synchronized on the radio signals that present the greatest energy on reception. However, the device would then be complex and would have a high energy consumption.

SUMMARY OF THE INVENTION

One aim of the present invention is therefore to propose a method of measuring the distance between two radiocommunication devices for which the abovementioned drawbacks are reduced.

For this, the invention proposes a method of measuring a distance between two radiocommunication devices which comprises the following steps:
a—by a first of the two devices: transmission of a radio signal requesting a measurement of an exchange delay between the two devices;
b—by the second device: reception of the request signal and, after an intermediate delay known to both devices, the sending of an acknowledgement radio signal; and
c—by the first device:
   reception of the acknowledgement signal;
   measurement of the time between the transmission of the request signal and the reception of the acknowledgement signal, then storage of said time as exchange delay; and
   calculation of a first time of flight of the request and acknowledgement signals based on the exchange delay and the intermediate delay.

Furthermore, the method comprises a transmission, by the second device, of a channel measurement frame adapted so that the first device determines, from various radio signal received corresponding to the channel measurement frame, a difference in time of flight between a propagation path corresponding to said first time of flight and the shortest propagation path followed by the radio signals transmitted between the two devices. The first device then calculates a second time of flight from the first time of flight and the difference in time of flight.

Thus, a method according to the invention comprises two distinct phases. The first phase consists in measuring the time between the transmission of the request signal and the reception of the acknowledgement signal by the first device. By appropriately setting an energy detection threshold, the synchronization of the first device on a subsequent reception of signals transmitted by the second device can be performed on a propagation path between the two devices that is followed by a large part, even the main part, of the energy of the transmitted request and/or acknowledgement radio signals. Thus, the time between the transmission of the request signal and the reception of the acknowledgement signal can be measured with a first device synchronized on the propagation path between the two devices that is followed by a large part, even the main part, of the energy of the transmitted radio signals. In particular, a data transmission between the two devices can thus be based on signals received with a high energy. It is then safer and more reliable.

If necessary, the length of the propagation path that is associated with the stored exchange time can be estimated by calculating the corresponding time of flight of the signals. It constitutes a first estimation of the distance between the two devices.

In the first phase of the method, the radio signals requesting the measurement of the exchange and acknowledgement delay are advantageously short. In particular, at least one of these signals can comprise a short frame, and in particular shorter than a channel measurement frame. This radio signal can then be quickly constructed and transmitted by the corresponding device, with an energy consumption during these steps and a mobilization of radio resources that are reduced.

Furthermore, a faster construction of the acknowledgement signal makes it possible to use a short intermediate delay, between the reception of the request signal and the transmission of the acknowledgement signal by the second device. The determination of the time of flight of step c is therefore more accurate, even if the internal clock of one of the devices is liable to drift. This superior accuracy concerns in particular the situations in which the two devices are relatively close to each other.

Another advantage results from the reduced length of the acknowledgement signal. To obtain an accurate measurement of the exchange delay, the acknowledgement message is transmitted by the second device by unilaterally mobilizing the radio resource, that is, without using the multiple-access manager of the second device. The disruption to other communications involving the second device is then all the lesser as this mobilization is short.

The second phase of the method makes it possible to determine the time of flight of the radio signals transmitted along the shortest propagation path between the two devices, based on the exchange time stored in the first phase. This second phase requires the construction and transmission of only a single channel measurement frame, carried out by the second device. The role of the first device is then limited to analyzing the channel measurement frame that it receives. The total energy consumed in the two devices to determine the separation distance between them is therefore reduced.

For most of the configurations of the radio transmission medium present between the two devices, the shortest time of flight identified by the first device according to the channel measurement frame corresponds to a straight-line propagation. The length of the separation distance between the two devices, measured in a straight line, can then be calculated by dividing the shortest time of flight identified by the propagation speed of the radio signals.

The second phase of a method according to the invention, that is, the determination of the time of flight corresponding to the shortest propagation path, is not necessarily carried out immediately after the first phase. It can be carried out with a waiting time after said first phase, provided that the radio transmission channel remains stationary between the two phases of the method. The channel is said to be stationary when the two devices remain substantially immobile and when the transmission medium in which the radio signals are propagated presents roughly constant characteristics. As an illustration, the channel measurement frame can be transmitted by the second device 10 milliseconds or so after the transmission of the acknowledgement signal, according to the availability of the channel measurement frame transmission channel. It is thus possible to reduce the disruption provoked for other communications involving the second device, by waiting for the multiple-access manager of the second device to indicate that an adequate time slot is available to transmit the channel measurement frame.

Finally, when the second device is not in a condition to proceed with the distance measurement, it does not transmit the channel measurement frame. No significant radio resource or quantity of energy are then consumed unnecessarily. Reasons why the second device is not in a condition to proceed with the distance measurement include, for example, that said device is outside the radio range of the device transmitting the measurement request, or that the second device does not have all the components necessary to implement the measurement method, or even that it does not have all the parameters necessary for this implementation.

The invention also concerns a radiocommunication device, adapted to implement the steps carried out by the first and/or the second of the two devices of a method of measuring distance between two devices as described previously.

It also relates to a communication system comprising at least two such devices. The separation distance between these two devices can be determined with a greater level of precision and accuracy. The term "accuracy" reflects the fact that the length of the propagation path that is estimated actually corresponds to a straight-line measurement of the distance between the two devices. Furthermore, communications carried in such a system are interrupted less frequently to measure the exchange delays by unilaterally mobilizing radio resources.

BRIEF DESCRIPTION OF THE DRAWINGS

Other features and advantages of the present invention will become apparent from the description below of an exemplary and nonlimiting implementation, with reference to the appended drawings, in which:

FIG. 2 is a chronological diagram of the various steps of a method according to the invention.

DESCRIPTION OF PREFERRED EMBODIMENTS

Figure 1:
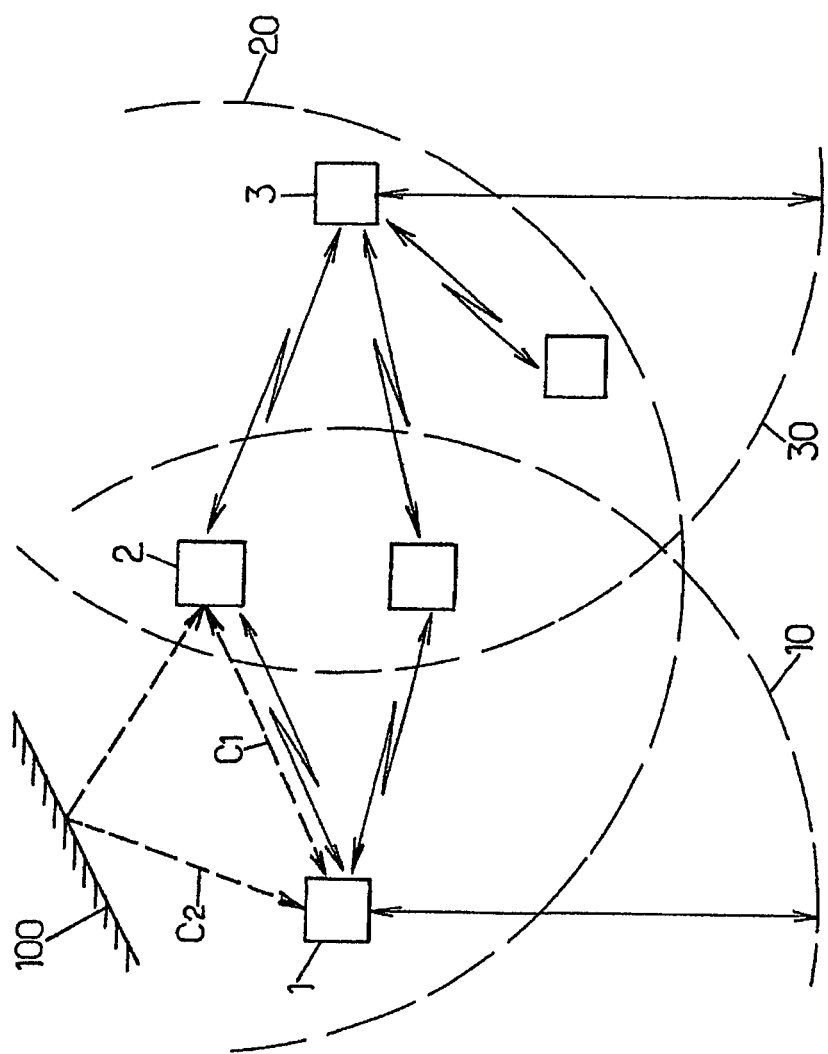
FIG. 1 illustrates a radiocommunication system intended to implement a method according to the invention.

According to FIG. 1, a communication system comprises a set of radio transmitter-receiver devices, three of which are referenced 1, 2 and 3. Each transmitter-receiver can constitute the radio interface of a sensor forming part of a home automation management system, for example. For such an application, certain sensors can be dedicated to thermal measurements, others to identifying the state of heating element control units, and so on. It can be an "ad hoc" system, which in turn manages the communication sequences between the various sensors. This can be, in particular, a Bluetooth®-type (i.e., wireless-type) system known to those skilled in the art. The broken-line curves 10, 20 and 30 in the figure diagrammatically indicate the respective range limits of the devices 1, 2 and 3. Thus, the device 2 can communicate with each of the devices 1 and 3, whereas the latter are out of radio range of each other.

FIG. 2 indicates the various actions carried out in the devices 1 and 2 when the device 1 initiates a radio communication with the device 2. The downward vertical axis corresponds to a time coordinate, denoted t. Firstly, the device 1 sends a request, denoted REQ, to the device 2. This request can have a two-fold function. It can indicate to the device 2 that a communication is solicited by the device 1. Furthermore, if the communication is accepted by the device 2, the request REQ initiates a measurement of the exchange delay of radio signals transmitted between the devices 1 and 2.

The device 1 identifies the instant of transmission of the request radio signals REQ relative to a clock internal to that device. It then stores that instant.

When the device 2 receives the request REQ, it can either reject the communication, or accept it. If it accepts it, it responds by addressing an acknowledgement signal ACK to the device 1. The detection and the reception of the radio signals by each of the devices 1 and 2 are carried out in a way that is known and not detailed further here.

The device 2 transmits the signal ACK after a determined waiting time, counted from the reception of the request REQ. This waiting time is set by the manufacturer of the devices and stored in each of them. It is denoted $T_W$ and called intermediate delay. It mainly enables a device that receives a request when it is in standby mode at the time of reception to switch to transmission mode. Furthermore, the frame of the signal ACK is prepared during the delay $T_W$.

The signal ACK is transmitted without involving the multiple-access manager of the device 2. In other words, at the end of the intermediate delay $T_W$, the device 2 interrupts any transmission or reception of radio signals that may be in progress to transmit the signal ACK. Such an interruption of transmission or of reception can relate to a communication between the device 2 and the device 3, for example. In this way, the time between the reception of the request REQ and the transmission of the signal ACK by the device 2 is known accurately by the device 1: it is equal to the delay $T_W$. It may be necessary to interrupt any communication that may be in progress between the devices 2 and 3 because, given the limited ranges 10 and 30 of the devices 1 and 3, the device 1 cannot detect the existence of such a communication in progress to know the instant of transmission of the signal ACK by the device 2.

When the device 1 receives the radio signal ACK, it identifies the instant of that reception relative to its own internal clock. It then determines the time elapsed since the stored instant of the transmission of the request REQ, until the instant of reception of the signal ACK. This time is called radio signal exchange time between the devices 1 and 2, and denoted $T_{EXCH}$. It is stored in the device 1 to synchronize the device 1 relative to communication radio signals transmitted subsequently by the device 2.

The device 1 then calculates a time of flight $T_{OF1}$ of the signals REQ and ACK according to the following formula (1):

$$T_{OF1}=0.5\times(T_{EXCH}-T_W) \quad (1)$$

A length of the paths taken by the signals REQ and ACK can also be calculated, by dividing $T_{OF1}$ by the propagation speed of the radio signal between the system devices. This speed is equal to $3.10^8$ m.s$^{-1}$.

At least one of the request REQ and acknowledgement ACK radio signals can comprise a communication frame. These signals are then short, particularly when they have no payload. In this case, their processing in each of the devices 1 and 2 can be carried out much closer to the physical layer. This processing is then fast and generates only a low energy consumption in each device.

Furthermore, the short length of the signal ACK reduces the risk of disrupting any communications between the devices 2 and 3. If necessary, it can also make it possible to reduce the intermediate delay $T_W$, such that the measurement of the exchange delay $T_{EXCH}$ is less affected by a drift of the internal clock of one of the two devices 1 and 2.

The exchange of the signals REQ and ACK and the calculation of $T_{OF1}$ constitute the first phase of the method of measuring the distance between the devices 1 and 2. This first phase corresponds to the steps a to c introduced in the general part of the description, and is denoted phase 1 in FIG. 2.

If necessary, phase 1 of the method can be repeated (phase 1a indicated in FIG. 2). Each time phase 1 is repeated, the time of flight $T_{OF1}$ is updated. If necessary, the time of flight $T_{OF1}$ calculated on a repetition of the phase 1 can take into account a number of the exchange delays stored on prior instances of the phase 1. For example, the exchange delay used in the formula (1) can be an average of the stored exchange delays. The resulting estimation of $T_{OF1}$ is more accurate.

A difference between the values of $T_{OF1}$ obtained in two successive executions of phase 1 can indicate that the transmission channel is not stationary. Phase 1 can then be repeated again until roughly identical successive values of $T_{OF1}$ are obtained, indicating that the channel has become stationary. In this case, the method is continued based on the latest values of $T_{OF1}$ which indicate that the channel is stationary.

The propagation path followed by the signals REQ and ACK can either link the devices 1 and 2 in a straight line (path C1 indicated in FIG. 1), or link them with at least one intermediate reflection. The path C2 indicated in FIG. 1 shows a reflection on a wall 100, for example made of metal. Because of this reflection, the path C2 is longer than the path C1. The time of flight $T_{OF1}$ generally corresponds to that of the propagation paths C1 and C2 which is followed by a main part of the energy of the radio signals REQ and ACK.

The second phase of the method of measuring the distance between the devices 1 and 2 is then carried out (phase 2 in FIG. 2). The device 2 transmits a channel measurement frame (CMF) to the device 1. In an advantageous variant of the invention, this transmission of the CMF frame is carried out with observation of the multiple access within the device 2. For this, the frame 2 is transmitted when the multiple-access manager of the device 2 identifies the possibility of having an adequate transmission time for the channel used for the signal ACK. The device 1 then analyzes all the received radio signals that correspond to the frame CMF. The structure of a channel measurement frame and the way it is analyzed are assumed to be known, and are not described in more detail here. The device 1 firstly identifies a first part of received radio signal as corresponding to a portion of the frame CMF that has followed the same propagation path as the acknowledgement signal ACK of phase 1. This identification can result from a comparison between the energy level of the first part of the received signal corresponding to the portion of frame CMF and that of the signal ACK received. The device 1 then looks to see if a second part of the received radio signal does not also correspond to a portion of the frame CMF, which has followed a propagation path that is shorter than that of the first part of the radio signal. This search is carried out by combining a selection of parts of the radio signal received by the device 1, carried out by means of a variable reception energy threshold, and a recognition of CMF frame portions. The device 1 deduces therefrom a difference in time of flight between the propagation path followed by the signal ACK and a shorter path, the existence of which is detected based on the received radio signal corresponding to the frame CMF. This difference is denoted $\Delta T_{OF}$.

When a number of shorter paths than that followed by the signal ACK are detected, the device 1 selects the shortest of them, that is, the one associated with the greatest value of $\Delta T_{OF}$.

The device 1 then calculates the time of flight of the signals transmitted between the two devices 1 and 2 along the shortest propagation path using the formula (2) below. This time of flight along the shortest path is denoted $T_{OF2}$.

$$T_{OF2} = T_{OF1} - \Delta T_{OF} \quad (2)$$

$T_{OF2}$ is a measurement of the length of the shortest propagation path. This length can be expressed in meters, by dividing $T_{OF2}$ by the propagation speed of the radio signals between the system devices. Most often it corresponds, like $T_{OF2}$, to a straight-line propagation of the radio signals between the devices 1 and 2 (path C1 in FIG. 1).

It is possible for the propagation path followed by the signal ACK of phase 1 to be the shortest path. In this case, the analysis of the radio signals received by the device 1 that correspond to the channel measurement frame CMF reveals no path that is even shorter. Phase 2 then leads to a zero value for $\Delta T_{OF}$.

Phase 2 of the method may therefore comprise only a single channel measurement. Phase 1, since it comprises none, can be carried out quickly.

According to a first improvement of the invention, the method can also comprise the transmission, by the device 1 to the device 2, of a signal comprising an indication of the time of flight $T_{OF2}$. Such indications are, for example, the value of the time of flight $T_{OF2}$ or the distance calculated from this value. The value of the measured distance that separates the two devices 1 and 2 is then available in each of the two devices. If necessary, the indication of the time of flight $T_{OF2}$ can also be communicated to other system devices, or only to certain of these devices that are located within radio transmission range of the device 1.

According to a second improvement of the invention, phase 1 of the method can be carried out again after the determination of the difference $\Delta T_{OF}$ between the time of flight $T_{OF1}$ calculated in phase 1 and the time of flight $T_{OF2}$ corresponding to the shortest propagation path followed by the radio signals between the two devices (phase 1b indicated in FIG. 2). A new value of $T_{OF1}$ is thus obtained, which is compared with that obtained in a prior instance of phase 1. It is thus possible to check that the radio transmission channel between the devices 1 and 2 has remained stationary throughout the method. Notably, an indication as to the accuracy of the determination of $T_{OF1}$ can be obtained. In particular, when the channel has not remained stationary, it is possible to indicate that the accuracy of this determination is compromised, and even, if necessary, the degree to which it is compromised. One benefit can be to order the determination of $T_{OF1}$ to be repeated if this degree is greater than a predefined threshold.

According to a third improvement of the invention, the channel measurement frame CMF is transmitted by the device 2 after the acknowledgement signal ACK, with a waiting time from the transmission of the acknowledgement signal which is greater than or equal to a determined guard time. This guard time is denoted $T_G$ in FIG. 2. It is used in particular to ensure that the device 1 has sufficient time to calculate $T_{OF1}$ before analyzing the received radio signals that correspond to the frame CMF. Thus, the value of $T_{OF1}$, and other values produced in phase 1 of the method such as the receive energy level of the signal ACK, are available in the device 1 when phase 2 is carried out. The time between the transmission of the signal ACK and that of the frame CMF by the device 2 is equal to the sum of the guard time $T_G$ and a delay due to the observance of the multiple access for the device 2. The $T_G$ value is stored in each device of the system on production or when said device is initialized. It must not be too high, in order for the channel used to communicate between the two devices to be considered as stationary between phases 1 and 2 of the method, even when one of the devices 1 or 2 moves or even if the radio transmission medium varies moderately. As an example, $T_G$ can be of the order of 10 milliseconds. In this case, phase 1 of the method can be repeated before the guard time has elapsed after the transmission of the first signal ACK by the device 2. Thus, the determination of the time of flight $T_{OF2}$ is not delayed by obtaining several successive values of $T_{OF1}$, to increase the accuracy of determination of $T_{OF1}$ and/or to check that the channel is stationary. Each time phase 1 is carried out, the value of $T_{OF1}$ can be updated.

The channel measurement frame CMF generally constitutes a relatively long radio signal. The construction of this frame by the device 2 and the channel measurement performed by the device 1 are therefore just as long. It is then possible for the internal clocks of the devices 1 and/or 2 to drift during the method. To limit any error on the result of the distance measurement caused by a drift of the internal clock of the device 1, it is possible to have the device 1 identify several first instants of reception of first radio signals corresponding to the frame CMF that have followed the same propagation path as the signal ACK. Second instants of reception of second radio signals corresponding to the frame CMF and that have followed other propagation paths between the devices 1 and 2 are then identified based on first different instants of reception. Each second instant of reception can thus be identified relative to a first instant such that the time elapsed between these two instants is short. In this way, the error on the determination of $\Delta T_{OF}$ that would result from any drift of the internal clock of the device 1 is minimized. The error that would result from a drift of the internal clock of the device 2 is also reduced in this way.

It is understood that numerous adaptations can be introduced relative to the method that has been described in detail above. In particular, in certain circumstances, it may be advantageous for the device 2 to transmit the channel measurement frame CMF before the steps a to c are carried out.

Finally, a method according to the invention is particularly well suited to a pulse transmission mode, commonly called UWB (Ultra Wide Band) transmission. However, it can also be applied to other types of radio transmission, such as the DS-SS (Direct Sequence Spread Spectrum) mode.

The invention claimed is:

1. A method of measuring a distance between two radiocommunication devices, comprising the following steps:
   a—by a first radiocommunication device of the two radiocommunication devices:
      transmitting a radio signal requesting a measurement of an exchange delay between the two devices;
   b—by a second radiocommunication device of the two radiocommunication devices:
      receiving the request signal; and
      sending an acknowledgement radio signal after an intermediate delay known to both the first and the second devices;
   c—by the first device:
      receiving the acknowledgement signal;
      measuring the time between transmitting the request signal and receiving the acknowledgement signal;
      storing said measured time as the exchange delay; and
      calculating a first time of flight of the request signal and of the acknowledgement signal based on the exchange delay and the intermediate delay; and
   d—by the second device:
      transmitting a single channel measurement frame configured so that the first device:
         determines, from various radio signals received corresponding to the single channel measurement frame, a difference in time of flight between a propagation path corresponding to said first time of flight and the shortest propagation path followed by the radio signals transmitted between the two devices; and
         calculates a second time of flight from the first time of flight and the difference in time of flight.

2. The method as claimed in claim 1, wherein at least one of the request and acknowledgement radio signals comprises a short frame.

3. The method as claimed in claim 1, wherein the propagation path corresponding to the first time of flight is followed by a main part of the energy of the request radio signal and of the acknowledgement signal.

4. The method as claimed in claim 1, also comprising a transmission, by the first device to the second device, of a signal comprising an indication of the second time of flight.

5. The method as claimed in claim 1, wherein the steps a to c are repeated, and wherein the first time of flight is updated each time the steps a to c are executed.

6. The method as claimed in claim 5, wherein the steps a to c are repeated after the difference between the first and second times of flight has been determined.

7. The method as claimed in claim 5, wherein the channel measurement frame is transmitted by the second device after the acknowledgement signal, wherein a waiting time from the transmission of the acknowledgement signal is greater than or equal to a determined guard time.

8. The method as claimed in claim 7, wherein the steps a to c are repeated before the guard time has elapsed from the transmission of a first acknowledgement signal by the second device.

9. The method as claimed in claim 1, wherein several first reception instants are identified by the first device, respectively for first radio signals corresponding to the channel measurement frame that have followed the same propagation path as the acknowledgement signal, and wherein second instants of reception of second radio signals corresponding to said frame and which have followed other propagation paths between the two devices are identified by said first device from different first reception instants.

10. The method as claimed in claim 1, wherein the channel measurement frame is transmitted by the second device after the acknowledgement signal, wherein a waiting time from the transmission of the acknowledgement signal is greater than or equal to a determined guard time.

11. A radiocommunication device configured to implement the steps of the method as claimed in any one of claims 1-9 or 10, wherein the radiocommunication device is configured as the first of the two radiocommunication devices.

12. A radiocommunication device configured to implement the steps of the method as claimed in any one of claims 1-9 or 10, wherein the radiocommunication device is configured as the second of the two radiocommunication devices.

13. A communication system comprising at least a first radiocommunication device and a second radiocommunication device, wherein said first and second radiocommunication devices are configured to implement the method as claimed in any one of claims 1-9 or 10.

* * * * *